United States Patent

Poduska et al.

(10) Patent No.: US 9,912,400 B1
(45) Date of Patent: Mar. 6, 2018

(54) CONCURRENT MOBILE USER OBJECTIVE SYSTEM STREAMING

(71) Applicants: Matthew J. Poduska, Mount Vernon, IA (US); Ryan J. Coppa, Cedar Rapids, IA (US); James A. Stevens, Lucas, TX (US); Sarah A. Miller, Cedar Rapids, IA (US)

(72) Inventors: Matthew J. Poduska, Mount Vernon, IA (US); Ryan J. Coppa, Cedar Rapids, IA (US); James A. Stevens, Lucas, TX (US); Sarah A. Miller, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 255 days.

(21) Appl. No.: 14/840,884

(22) Filed: Aug. 31, 2015

(51) Int. Cl.
*G06F 9/455* (2006.01)
*H04B 10/118* (2013.01)
*H04B 7/185* (2006.01)
*H04W 76/02* (2009.01)
*H04W 88/02* (2009.01)
*H04L 5/00* (2006.01)

(52) U.S. Cl.
CPC ....... *H04B 7/18513* (2013.01); *H04L 5/0042* (2013.01); *H04W 76/02* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 9,495,179 B1* | 11/2016 | Miller | G06F 17/50 |
| 2009/0168861 A1* | 7/2009 | Marshall | H04B 1/7103 375/227 |
| 2010/0195775 A1* | 8/2010 | Chamberlain | H04B 1/1036 375/350 |
| 2012/0227038 A1* | 9/2012 | Hunt | G06F 9/45558 718/1 |
| 2012/0243465 A1* | 9/2012 | Wohlford | H04W 76/025 370/316 |
| 2013/0117359 A1* | 5/2013 | Husain | H04L 67/34 709/203 |
| 2013/0185556 A1* | 7/2013 | Eigle | H04W 12/02 713/168 |
| 2015/0341110 A1* | 11/2015 | Hall | H04B 7/0617 370/316 |
| 2016/0170795 A1* | 6/2016 | Sanghvi | G06F 9/45558 718/1 |

* cited by examiner

*Primary Examiner* — Duc T Duong
(74) *Attorney, Agent, or Firm* — Angel N. Gerdzhikov; Donna P. Suchy; Daniel M. Barbieri

(57) ABSTRACT

A computer defined radio includes a Mobile User Objective System (MUOS) terminal configured to instantiate two or more virtual terminals. Each of the two or more virtual terminals provides all of the functionality of a MUOS terminal with satellite communication through a single antenna. Each of the two or more virtual terminals may join a separate group as defined by MUOS specifications, and give the single MUOS terminal access to the disparate groups. Each of the two or more virtual terminals is configured to operate at a different bitrate such that the total power consumption of the MUOS terminal is less than the same number of physical terminals operating separately.

17 Claims, 5 Drawing Sheets

CONCURRENT MOBILE USER OBJECTIVE SYSTEM STREAMING

BACKGROUND

The Mobile User Objective System (MUOS) is a narrowband military communications satellite system that supports a worldwide, multi-service population of users in the ultra-high frequency (UHF) band. MUOS is an array of geosynchronous satellites that provide global satellite communications (SATCOM) narrowband connectivity for use at data rates up to 384 kbit/s. The system provides increased communications capabilities to newer, smaller terminals while still supporting interoperability with legacy terminals. MUOS is designed to support users that require greater mobility, higher bit rates and improved operational availability.

MUOS will replace the legacy UHF Follow-On system to provide users with new capabilities and enhanced mobility, access, capacity, and quality of service. Intended primarily for mobile users (e.g. aerial and maritime platforms, ground vehicles, and dismounted soldiers), MUOS extends users' voice, data, and video communications beyond their lines-of-sight.

The current MUOS waveform architecture supports a single active audio or serial stream per user equipment instance. Consequently, it would be advantageous if an apparatus existed that is suitable for providing multiple active audio and serial data streams with a single MUOS user equipment instance.

SUMMARY

Embodiments of the inventive concepts disclosed herein are directed to a novel method and apparatus for providing multiple active audio and serial data streams with a single MUOS user equipment instance or physical terminal.

In one aspect, the inventive concepts disclosed herein are directed to a computer defined radio which includes a physical MUOS terminal configured to instantiate two or more virtual terminals. Each of the two or more virtual terminals provides all of the functionality of a MUOS terminal with satellite communication through a single antenna. Each of the two or more virtual terminals may join a separate group as defined by MUOS specifications, and give the single physical terminal access to the disparate groups.

Each of the two or more virtual terminals may be configured to operate at a different bitrate such that the total power consumption of the MUOS terminal is less than the same number of physical terminals operating separately.

It is to be understood that both the foregoing general description and the following detailed description are exemplary and explanatory only and should not restrict the scope of the claims. The accompanying drawings, which are incorporated in and constitute a part of the specification, illustrate an embodiment of the inventive concepts disclosed herein and together with the general description, serve to explain the principles.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, which are illustrated in the accompanying drawings. The broad scope of the inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
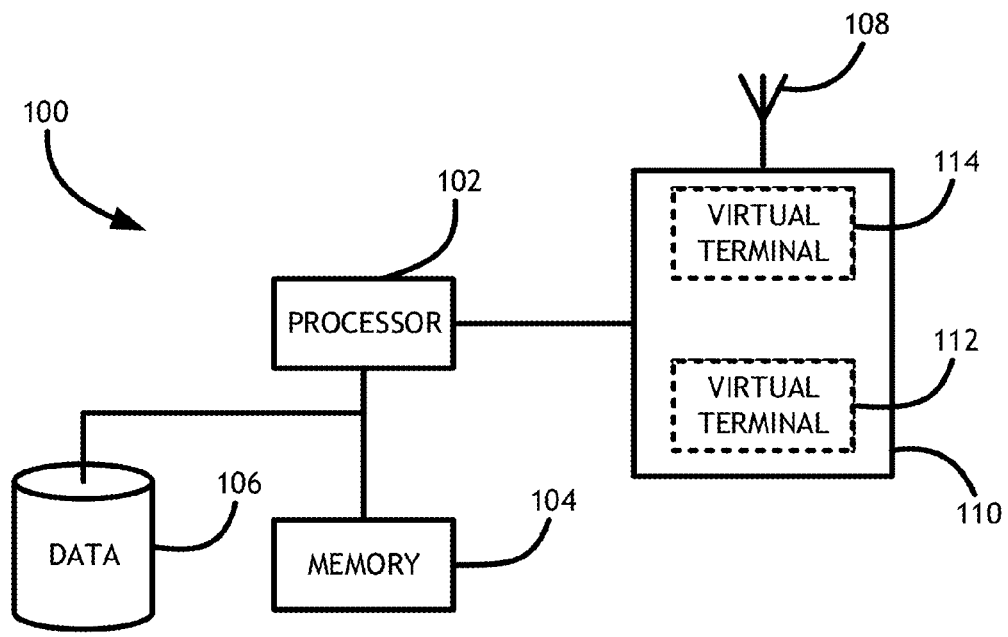
FIG. 1 shows a computer system for implementing embodiments of the inventive concepts disclosed herein.

Referring to FIG. 1, a computer system 100 for implementing embodiments of the inventive concepts disclosed includes a processor 102, a memory 104 for storing processor executable code, a physical Mobile User Objective System (MUOS) terminal 110 (radio frequency (RF) front end) connected to the processor 102, and, an antenna 108 connected to the MUOS terminal 110 for satellite communication. The system 100 may include a data storage element 106 for storing data streams directed to the MUOS terminal 110. The processor 102 establishes a MUOS compliant 5 MHz communication channel to a MUOS enabled satellite via the MUOS terminal 110 and antenna 108 to communicate with the MUOS enabled satellite via the channel.

The MUOS terminal 110 is configured to instantiate a plurality of virtual terminals 112 and 114, each having all of the functionality of a MUOS terminal. Each virtual terminal 112 and 114 may be allocated segregated space in the memory 104 or in the data storage element 106 for enabling MUOS functionality.

Each of the plurality of virtual terminals 112 and 114 may access the antenna 108 to establish a datalink with a satellite according to MUOS specifications. Alternatively, the processor 102 may be configured to regulate data traffic from each of the virtual terminals 112 and 114 to the satellite such that the virtual terminals 112 and 114 are perceived by the satellite as a single MUOS terminal 110. Embodiments of the inventive concepts disclosed herein may allow a single MUOS terminal 110 to communicate with multiple endpoint user terminals, or allow a single MOUS terminal 110 to present as multiple user terminals.

In some embodiments, the processor 102 implements cryptographic associations (HAIPE, SCIP, etc) and, if necessary vocoders (MELPe, G.729, etc.), for audio and data connections between the virtual terminals 112 and 114 and one or more endpoints. A user (either a person or electronic element of the system 100 utilizing MUOS functionality) sends audio or data to one or more connections for over-the-air transmission via the antenna 108. Audio may be provided using various input ports including but not limited to push-to-talk (PTT), intercom, and audio-over-Ethernet. The MUOS waveform supports internet protocol (IP) connections data connections. Data may be provided or received by multiple serial interfaces, or a multiplexed interface. Received audio may be combined with audio leveling by the processor 102 to allow reception of multiple conversations simultaneously.

In one embodiment, the system 100 comprises a Code Division Multiple Access (CDMA) based communications system such as a cellular device. The MUOS waveform specification assumes a CDMA system with a single antenna 108 and a single RF front end. The MUOS terminal 110, or the processor 102 is configured to make all transmissions in a MUOS CDMA channel allocated to the MUOS terminal 110 conform to the MUOS specific waveform.

In one embodiment, the system 100 may be power limited. Mobile platforms, which are the general focus of MUOS, generally have limited electrical resources to apply to audio and data communication. The MUOS terminal 110 may be configured to adjust bitrates of the virtual terminals 112 and 114, either collectively or individually, to ensure the total power usage does not exceed a predetermined maximum, such as 384 kbits/s (the maximum rate for any single MUOS terminal 110). For example, a first virtual terminal 112 may operate at 64 kbits while a second virtual terminal 114 may operate at 12 kbits.

In one embodiment, the established MUOS 5 MHz RF channel between the MUOS terminal 110 and the MUOS enabled satellite may define a limit to the bandwidth useable by the MUOS terminal 110, in which case the MUOS terminal 110 will dynamically allocate bandwidth between the virtual terminals 112 and 114 as necessary. In another embodiment, each virtual terminal 112 and 114 may represent a separate MUOS instance to the MUOS enabled satellite, resulting in the MUOS enabled satellite allocating channel space sufficient for two MUOS terminals 110. In that case, the MUOS terminal 110 may operate as a single MUOS terminal 110 with double the throughput capacity.

A plurality of virtual terminals 112 and 114 operating in the same or similar frequency bands could potentially cause interference. The MUOS terminal 110, or alternatively the processor 102, defines the frequency range for each virtual terminal 112 and 114 to avoid intermods when the virtual terminals 112 and 114 transmit. In another embodiment, the MUOS terminal 110, or alternatively the processor 102, introduces jitter into one or more of the signals produced by the virtual terminal 112 and 114 to mitigate any interference. Alternatively, the MUOS terminal 110 or the processor 102 may assign distinct voice, serial data, and packet data sub-channels to each virtual terminal 112 and 114 to prevent interference. Voice, serial data, and packet data sub-channels may include sub-frequency ranges within the frequency range defined for the MUOS 5 MHz RF channel, or transmissions spread across time within a single frequency range. Voice, serial data, and packet data may be transmitted concurrently. Further, each virtual terminal 112 and 114 may be assigned a space-time division multiple access (STDMA) code, either within the frequency range defined by the MUOS 5 MHz RF channel or a sub-frequency range within that MUOS 5 MHz RF channel.

Multiple MUOS satellites may operate in the same frequency range. The system 100 may maintain connections to more than one MUOS satellite for redundancy. The antenna 108 may be omnidirectional or a directional, parabolic antenna 108. Where the system 100 is installed in an aircraft with a parabolic antenna 108, the aircraft may maintain connectivity to the multiple MUOS satellites through intermittent banking.

In one embodiment, each virtual terminal 112 and 114 joins a separate group as defined by MUOS specifications. The MUOS terminals 110 are generally excluded from joining more than one group at one time; information distributed over a group can be audio, serial data, or packet data, but different information types cannot be distributed concurrently. Where the first virtual terminal 112 joins a first group and the second virtual terminal 114 joins a second group, the MUOS terminal 110 or the processor 102 may send and receive data in both groups concurrently. Likewise, each virtual terminal 112 and 114 may be assigned a distinct security classification. Concurrent streams at different security classifications are thereby available to the MUOS terminal 110 or the processor 102. Different security classifications may require segregated system 100 resources depending of the security protocol.

In one embodiment, one or more virtual terminals 112 and 114 in the plurality of virtual terminals 112 and 114 are designated as "listen only" user terminals while one or more other virtual terminals 112 and 114 are designated as "listen and transmit" user terminals. For example, in a military command situation, a commander may designate the first virtual terminal 112, connected to an endpoint requiring bidirectional interaction, to both receive and transmit, while the second virtual terminal 114, connected to an endpoint having information pertinent to the commander, is designated as "listen only." In this embodiment, the commander has multiple voice, serial data, and packet data channels for receiving information but one centralized voice, serial data, and packet data channel for distributing information.

Each virtual terminal 112 and 114, or alternatively, the processor 102, may select one of a set of predefined codes and frequencies. Further, the MUOS terminal 110, each virtual terminal 112 and 114, or the processor 102 may select different frequencies for each virtual terminal 112 and 114 to reduce interference.

Figure 2:
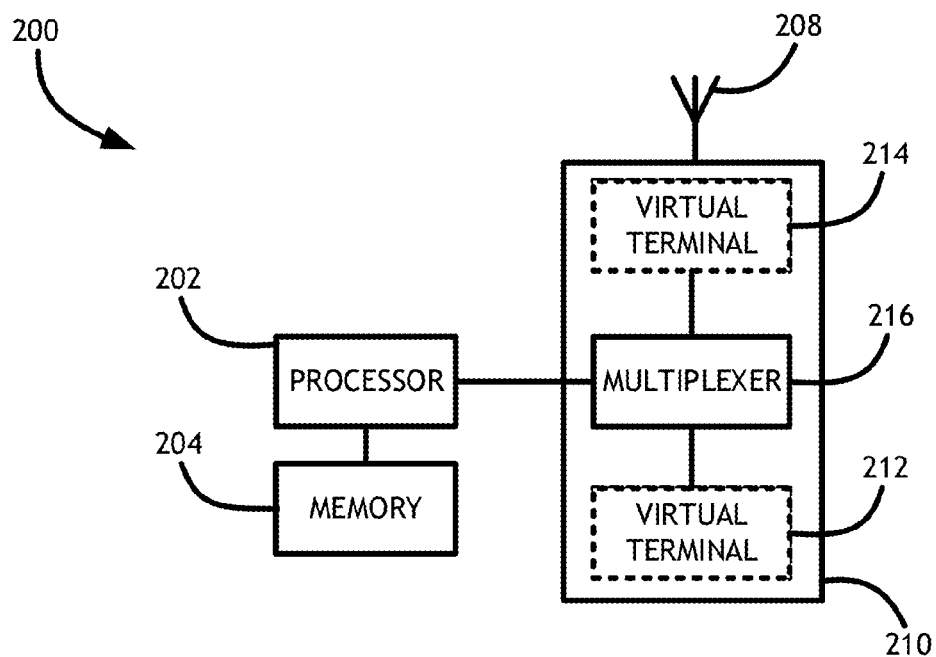
FIG. 2 shows a computer system for implementing an exemplary embodiment of the inventive concepts disclosed herein.

Referring to FIG. 2, a computer system 200 for implementing an alternative embodiment of the inventive concepts disclosed herein includes a processor 200, a memory 204 for storing processor-executable code, a physical MUOS terminal 210 including a multiplexer (MUX) 216 and configured to instantiate a plurality of virtual terminals 212 and 214, and an antenna 208 connected to the MOUS terminal 210 for satellite communication. In some cases, the MUX 216 may be part of the processor 202. The MUX 216 is configured to multiplex signals from the plurality of virtual terminals 212 and 214 such that voice, serial data, and packet data streams from each virtual terminal 212 and 214 may be transmitted in a single data packet. Multiplexing signals from the plurality of virtual terminals 212 and 214 may limit the additional power usage associated with additional streams.

In another embodiment, the MUX 216 may comprise an inverse multiplexer. Where the MUOS terminal 210 establishes an individual MUOS 5 MHz RF connection for each virtual terminal 212 and 214, the MUX 216 may break one voice, serial data, and packet data stream into separate voice, serial data, and packet data streams, each associated with one of the plurality of virtual terminals 212 and 214 to increase the total data rate of the MUOS terminal 210. Inverse multiplexing may be useful where the system 200 establishes multiple 3G connections.

Figure 3:
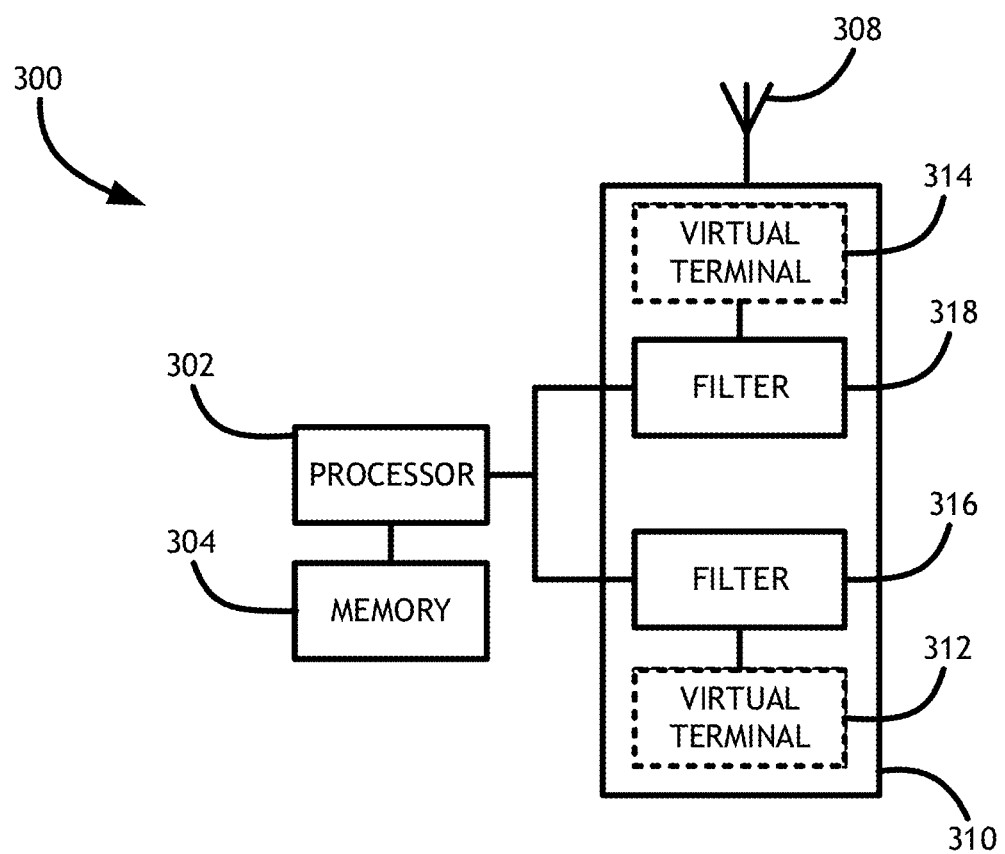
FIG. 3 shows a computer system for implementing an exemplary embodiment of the inventive concepts disclosed herein.

Referring to FIG. 3, a software defined radio system 300 according to the inventive concepts disclosed herein includes a processor 300, a memory 304 for storing processor-executable code, a physical MUOS terminal 310 configured to instantiate a plurality of virtual terminals 312 and 314, and an antenna 308 connected to the MOUS terminal 310 for satellite communication. The MUOS terminal 310 may include filters 316 and 318. Each of the filters 316 and 318 may be configured to maintain signals from the virtual terminals 312 and 314 within a frequency range defined by the MUOS 5 MHz RF channel in which the MUOS terminal 310 is configured to operate.

MUOS enabled satellites generally define four different 5 MHz RF channels. The system 300 may support communication in all four 5 MHz RF channels. In one embodiment, each filter 316 and 318 may operate within the same 5 MHz frequency range defined by a MUOS 5 MHz RF channel. Alternatively, a single 5 MHz filter (e.g., 316 or 318) may service more than one virtual terminal 312 and 314.

In some embodiments, where the MUOS terminal 310 is configured to establish a separate connection for each virtual terminal 312 and 314 in a separate MUOS 5 MHz RF channel, each virtual terminal 312 and 314 may be associated with a separate filter 316 and 318. In such embodiment, a first virtual terminal 312 may operate in a first MUOS 5 MHz RF channel, with the signal from the first virtual terminal 312 passing through a first filter 316 with a 5 MHz frequency band corresponding to the first MUOS 5 MHz RF channel; likewise, a second virtual terminal 314 may operate in a second MUOS 5 MHz RF channel, with the signal from the second virtual terminal 314 passing through a second filter 318 with a 5 MHz frequency band corresponding to the second MUOS 5 MHz RF channel.

Figure 4:
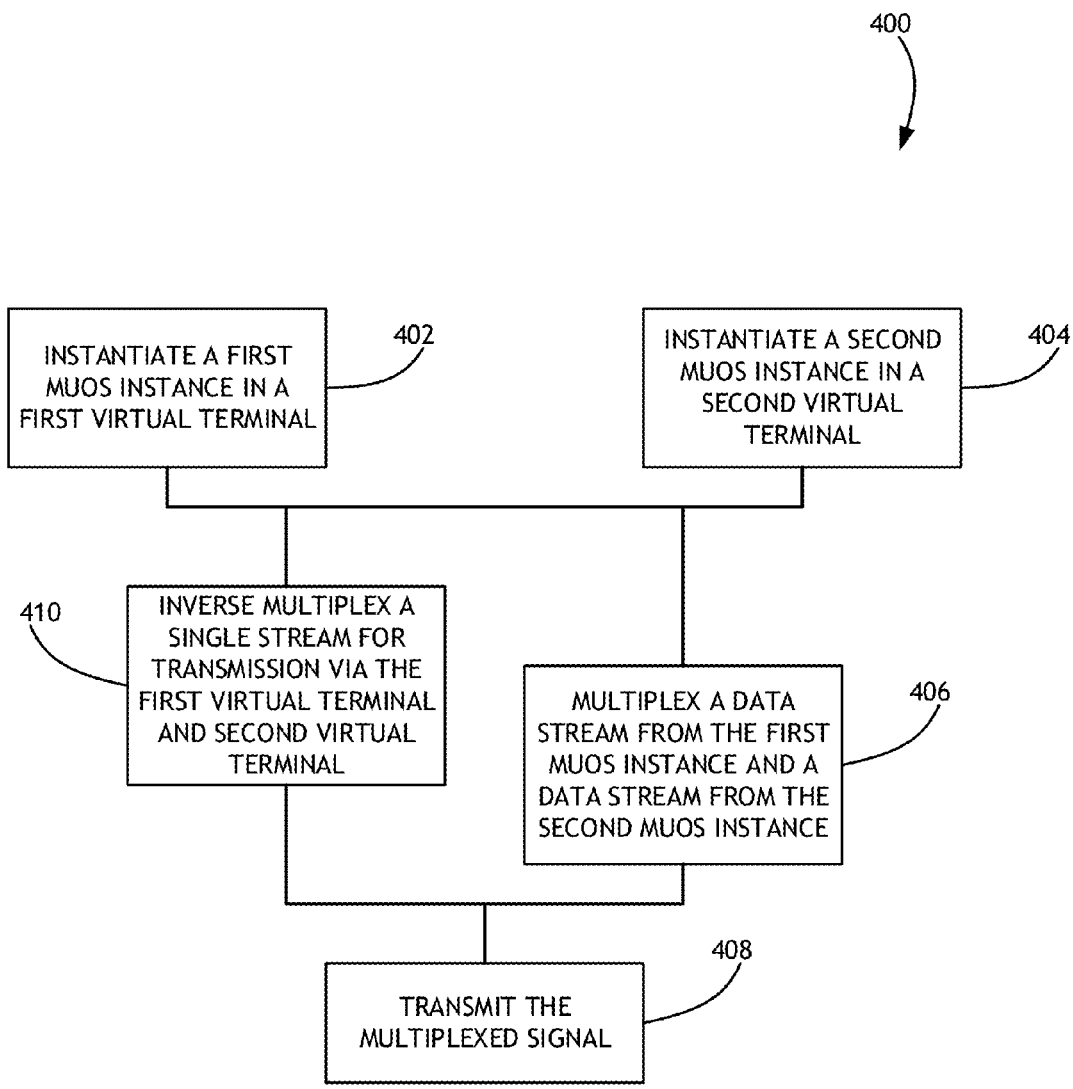
FIG. 4 shows a flowchart of a method according to one embodiment of the inventive concepts disclosed herein.

Referring to FIG. 4, a flowchart of a method 400 according to one embodiment of the inventive concepts disclosed herein is shown. A MUOS configured radio instantiates a first virtual MUOS terminal at 402 and instantiates a second virtual MUOS terminal at 404. Each of the first virtual terminal and second virtual terminal are configured to establish separate connections to one or more MUOS enabled satellites.

In one embodiment, signals from each of the first virtual terminal and second virtual terminal are multiplexed at 406 and transmitted at 408 to the one or more MUOS enabled satellites through a single MUOS 5 MHz RF channel. A single voice, serial data, and packet data stream may be inverse multiplexed into two or more signals at 410, each associated with one of the first virtual terminal and second virtual terminal. The inverse multiplexed signals may be transmitted via two or more MUOS 5 MHz RF channels to increase throughput at 410.

Figure 5:
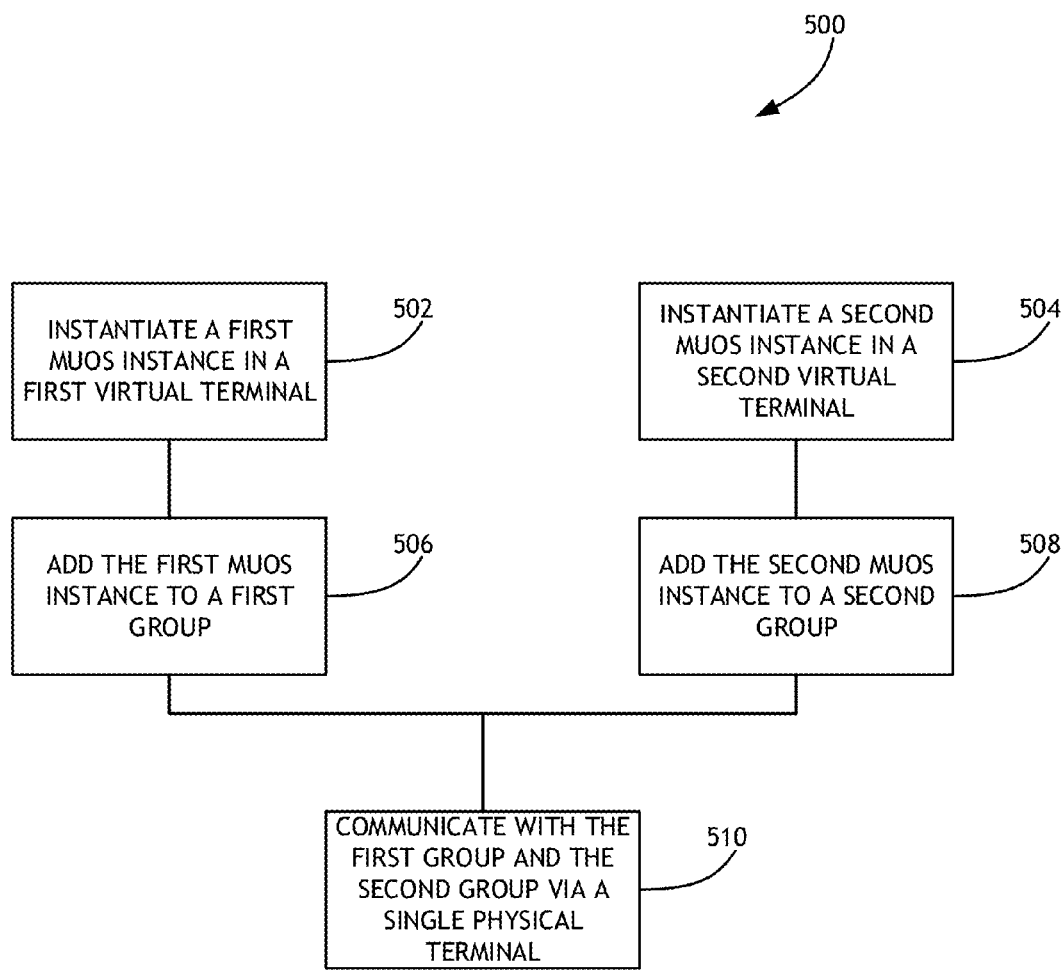
FIG. 5 shows a flowchart of a method according to an exemplary embodiment of the inventive concepts disclosed herein.

Referring to FIG. 5, a flowchart of a method 500 according to an embodiment of the inventive concepts disclosed herein is shown. A MUOS configured radio instantiates a first virtual MUOS terminal at 502 and instantiates a second virtual MUOS terminal at 504. Each of the first virtual terminal and second virtual terminal are configured to establish separate connections to one or more MUOS enabled satellites.

The first virtual terminal is added to a first MUOS group at 506 and the second virtual terminal is added to a second MUOS group at 508. The MUOS configured radio communicates with the first group and second group at 510.

Figure 6:
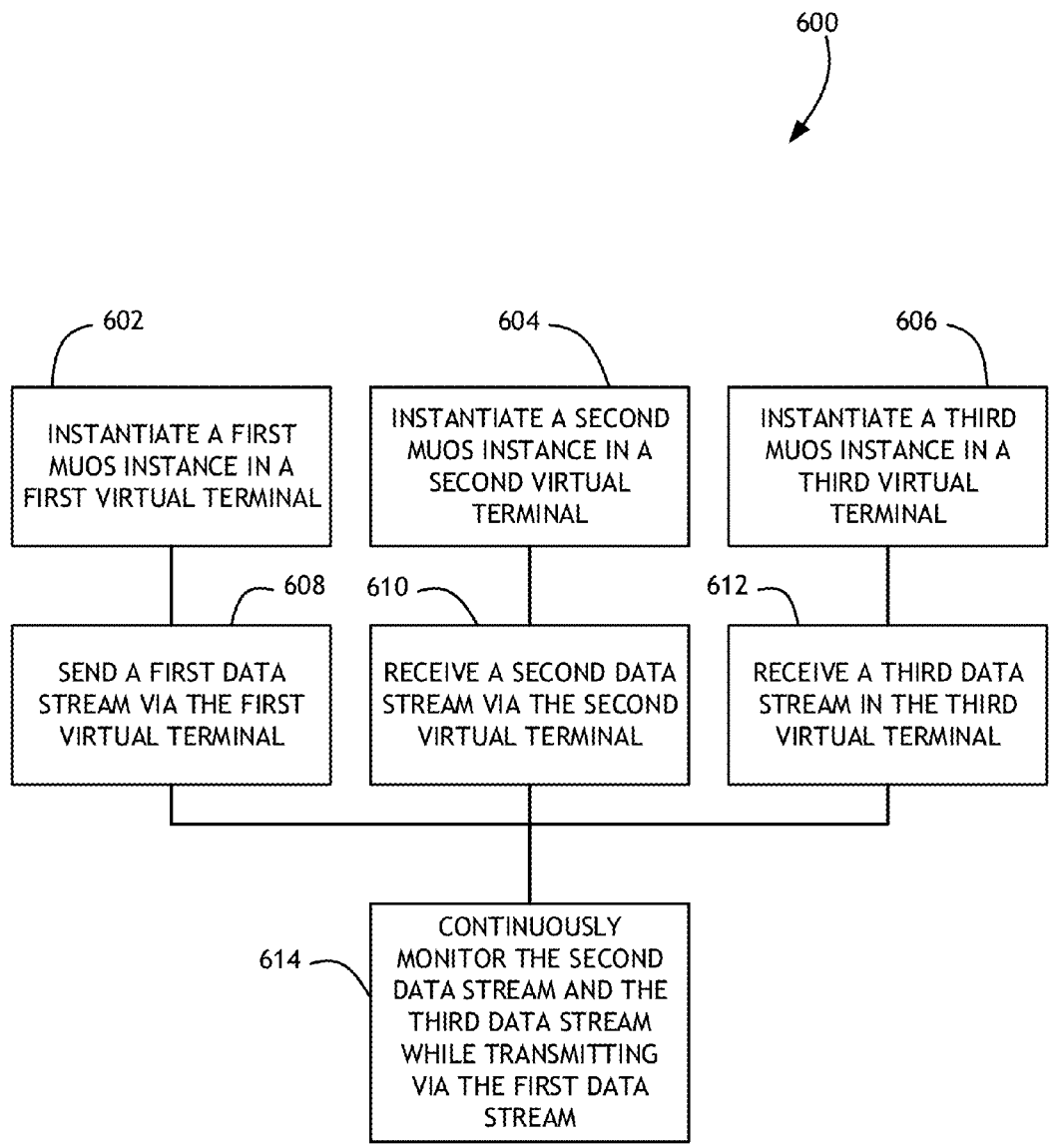
FIG. 6 shows a flowchart of a method according to an exemplary embodiment of the inventive concepts disclosed herein.

Referring to FIG. 6, a flowchart of a method 600 according to an embodiment of the inventive concepts of the present disclosure is shown. A MUOS configured radio instantiates a first virtual MUOS terminal at 602, instantiates a second virtual MUOS terminal at 604, and instantiates a third MUOS virtual terminal at 606. Each of the first virtual terminal, second virtual terminal, and third virtual terminal are configured to establish separate connections to one or more MUOS enabled satellites.

The MUOS configured radio identifies the first virtual MUOS terminal as a "listen and transmit" user terminal such that the MUOS configured radio can send a first data stream via the first virtual MUOS terminal at 608. The MUOS configured radio identifies the second virtual MUOS terminal and third virtual MUOS terminal as "listen only" user terminals such that the MUOS configured radio receives voice, serial data, and packet data streams via the second virtual MUOS terminal at 610 and receives voice, serial data, and packet data streams via the third virtual MUOS terminal at 612, but does not transmit via either the second or third virtual MUOS terminals.

The MUOS configured radio continuously monitors the second virtual MUOS terminal and third virtual MUOS terminal while transmitting over the first virtual MUOS terminal at 614. Each of the first, second, and third virtual MUOS terminals may be members of different MUOS groups.

It is believed that the present disclosure and many of its attendant advantages will be understood by the foregoing description of embodiments of the inventive concepts disclosed herein, and it will be apparent that various changes may be made in the form, construction, and arrangement of the components thereof without departing from the scope and spirit of the inventive concepts disclosed herein or without sacrificing all of their material advantages. The form herein before described being merely an explanatory embodiment thereof, it is the intention of the following claims to encompass and include such changes.

What is claimed is:

1. A communications system comprising:
   at least one processor;
   a memory connected to the at least one processor, the memory configured to embody processor-executable code;
   an antenna connected to the at least one processor, the antenna configured for satellite communication;
   a multiplexer connected to the at least one processor;
   a Mobile User Objective System (MUOS) terminal; and
   processor executable code embodied in the memory, wherein:
      the multiplexer is configured to receive signals from, and send signals to, a first virtual terminal in the plurality of virtual terminals;
      the multiplexer is configured to receive signals from, and send signals to, a second virtual terminal in the plurality of virtual terminals;
      the MUOS terminal is configured to instantiate a plurality of virtual terminals; and
      the processor executable code configures the at least one processor to establish one or more connections between each of the plurality of virtual terminals and one or more MUOS enabled satellites via one or more MUOS channels.

2. The communication system of claim 1, wherein the multiplexer is configured to:
   receive a single signal from the MUOS terminal;
   inverse multiplex the single signal into a plurality of signals;
   transmit each of the plurality of signals via a separate MUOS channel in the one or more MUOS channels, each MUOS channel associated with a separate virtual terminal in the plurality of virtual terminals.

3. The communication system of claim 1, wherein the multiplexer is configured to:
   multiplex signals from the first virtual terminal and the second virtual terminal; and transmit the multiplexed signal via a single MUOS channel in the one or more MUOS channels.

4. The communication system of claim 1, further comprising:
a first filter connected to a first virtual terminal in the plurality of virtual terminals; and
a second filter connected to a second virtual terminal in the plurality of virtual terminals,
wherein:
the first filter is configured to filter signals from the first virtual terminal in a 5 MHz frequency range defined by a first MUOS channel in the one or more MUOS channels; and
the second filter is configured to filter signals from the second virtual terminal in a 5 MHz frequency range defined by a second MUOS channel in the one or more MUOS channels.

5. The communication system of claim 1, wherein:
the processor executable code configures the at least one processor to:
add a first virtual terminal in the plurality of virtual terminals to a first MUOS group; and
add a second virtual terminal in the plurality of virtual terminals to a second MUOS group; and
the MUOS terminal is configured for bidirectional communication in the first MUOS group and the second MUOS group.

6. The communication system of claim 1, wherein:
the MUOS terminal configures a first virtual terminal in the plurality of virtual terminals for bidirectional communication;
the MUOS terminal configures a second virtual terminal in the plurality of virtual terminals for "listen only" communication; and
the processor executable code configures the at least one processor to restrict transmission to a MUOS channel in the one or more MUOS channels associated with the first virtual terminal.

7. A method of data communication comprising:
instantiating a first virtual terminal in a Mobile User Objective System (MUOS) terminal;
instantiating a second virtual terminal in the MUOS terminal;
establishing a connection between the first virtual terminal and at least one MUOS enabled satellite via a first MUOS channel;
filtering signals from the first virtual terminal in a 5 MHz frequency range defined by the first MUOS channel;
establishing a connection between the second virtual terminal and at least one MUOS enabled satellite via a second MUOS channel; and
filtering signals from the second virtual terminal in a 5 MHz frequency range defined by the second MUOS channel.

8. The method of claim 7, further comprising:
multiplexing signals from the first virtual terminal and the second virtual terminal; and
transmitting the multiplexed signal via the first MUOS channel.

9. The method of claim 8, wherein the multiplexer is configured to:
receive a single signal from the MUOS terminal;
inverse multiplex the single signal into at least two transmission signals;
transmit a first transmission signal via the first MUOS channel and a second transmission signal via the second MUOS channel.

10. The method of claim 7, further comprising:
adding the first virtual terminal to a first MUOS group; and
adding the second virtual terminal to a second MUOS group; and
streaming signals in the first MUOS group and the second MUOS group, concurrently.

11. The method of claim 7, further comprising:
configuring the first virtual terminal for bidirectional communication;
configuring the second virtual terminal for "listen only" communication; and
restricting transmission to the first MUOS channel.

12. A mobile platform comprising:
a communication system comprising:
at least one processor;
a memory connected to the at least one processor, the memory configured to embody processor-executable code;
an antenna connected to the at least one processor, the antenna configured for satellite communication;
a Mobile User Objective System (MUOS) terminal; and
processor executable code embodied in the memory,
wherein:
the processor executable code configures the at least one processor to:
establish one or more connections between each of the plurality of virtual terminals and one or more MUOS enabled satellites via one or more MUOS channels;
add a first virtual terminal in the plurality of virtual terminals to a first MUOS group; and
add a second virtual terminal in the plurality of virtual terminals to a second MUOS group; and
the MUOS terminal is configured to instantiate a plurality of virtual terminals, and is configured for bidirectional communication in the first MUOS group and the second MUOS group.

13. The mobile platform of claim 12, further comprising a multiplexer connected to the at least one processor, wherein:
the multiplexer is configured to receive signals from, and send signals to, a first virtual terminal in the plurality of virtual terminals; and
the multiplexer is configured to receive signals from, and send signals to, a second virtual terminal in the plurality of virtual terminals.

14. The mobile platform of claim 13, wherein the multiplexer is configured to:
receive a single signal from the MUOS terminal;
inverse multiplex the single signal into a plurality of signals;
transmit each of the plurality of signals via a separate MUOS channel in the one or more MUOS channels, each MUOS channel associated with a separate virtual terminal in the plurality of virtual terminals.

15. The mobile platform of claim 13, wherein the multiplexer is configured to:
multiplex signals from the first virtual terminal and the second virtual terminal; and
transmit the multiplexed signal via a single MUOS channel in the one or more MUOS channels.

16. The mobile platform of claim 12, further comprising:
a first filter connected to a first virtual terminal in the plurality of virtual terminals; and a second filter connected to a second virtual terminal in the plurality of virtual terminals, wherein:

the first filter is configured to filter signals from the first virtual terminal in a 5 MHz frequency range defined by a first MUOS channel in the one or more MUOS channels; and the second filter is configured to filter signals from the second virtual terminal in a 5 MHz frequency range defined by a second MUOS channel in the one or more MUOS channels.

17. The mobile platform of claim 12, wherein:

the MUOS terminal configures a first virtual terminal in the plurality of virtual terminals for bidirectional communication;

the MUOS terminal configures a second virtual terminal in the plurality of virtual terminals for "listen only" communication; and the processor executable code configures the processor to restrict transmission to a MUOS channel in the one or more MUOS channels associated with the first virtual terminal.

* * * * *